(No Model.)
F. C. STRAUB.
SEAT FOR VEHICLES.
No. 406,182. Patented July 2, 1889.
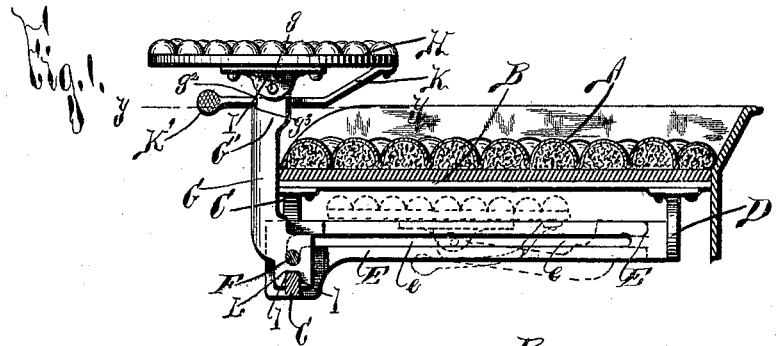
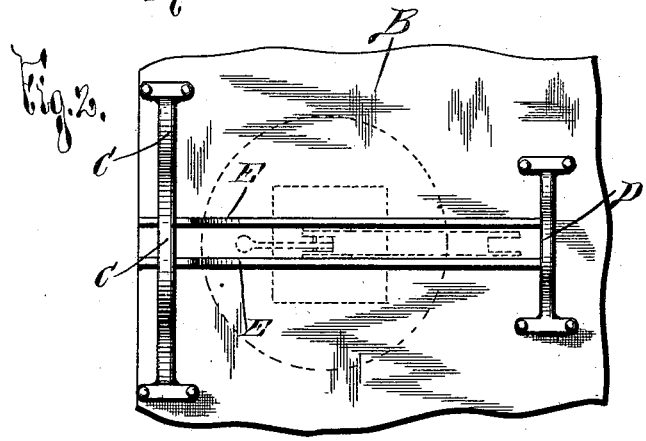
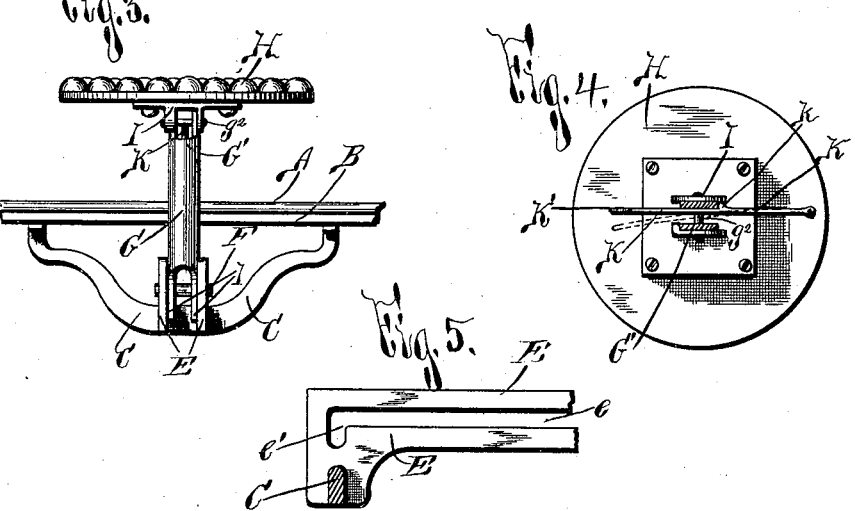
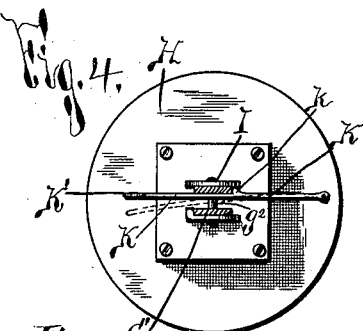
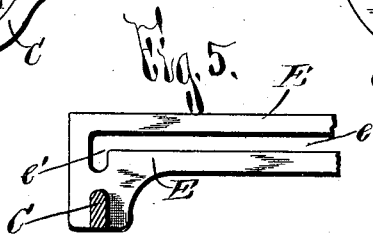
WITNESSES:
INVENTOR
Frederick C. Straub
BY
George W. Hey.
ATTORNEY

UNITED STATES PATENT OFFICE.

FREDERICK C. STRAUB, OF SYRACUSE, NEW YORK.

SEAT FOR VEHICLES.

SPECIFICATION forming part of Letters Patent No. 406,182, dated July 2, 1889.

Application filed December 3, 1888. Serial No. 292,485. (No model.)

*To all whom it may concern:*

Be it known that I, FREDERICK C. STRAUB, of Syracuse, in the county of Onondaga, in the State of New York, have invented new and useful Improvements in Auxiliary Seats for Vehicles, of which the following, taken in connection with the accompanying drawings, is a full, clear, and exact description.

My invention relates to an auxiliary seat for buggies or vehicles, and has for its object the production of a simple and effective seat of novel and peculiar construction adapted to be either normally concealed or hidden beneath the usual seat of the vehicle, or, when desired, withdrawn and unfolded or set up in operative position, furnishing additional seat-room; and to this end it consists, essentially, in a seat of ordinary or any desirable construction hinged to a supporting-standard, means for retaining said hinged seat in its desired position upon its supporting-standard, and a guideway or cross-bars beneath the seat in which the free end of the supporting seat-standard is guided, said standard being adapted to be firmly supported when the seat is in its operative position.

It furthermore consists in the detail construction and arrangement of the parts, all as hereinafter more fully described, and pointed out in the claims.

In specifying my invention reference is had to the accompanying drawings, forming a part of this specification, in which like letters indicate corresponding parts in all the views.

Figure 1 is a side elevation of a portion of an ordinary seat of a vehicle with my improved auxiliary seat attached thereto, the vehicle-seat being shown in section, and a portion of the guide-bar of the auxiliary seat being broken away for the purpose of illustration. Fig. 2 is an inverted plan view of the auxiliary seat in its normal concealed position, as indicated in Fig. 1 by dotted lines, and a detached portion of the ordinary seat of the vehicle. Fig. 3 is a front elevation of Fig. 1, showing the auxiliary seat in its operative position, and illustrating the means for retaining said seat upon the standard to which it is hinged. Fig. 4 is a horizontal inverted section taken on line $y\ y$, Fig. 1, illustrating the means for retaining the auxiliary seat in its operative position; and Fig. 5 is a detached view of one of the guide-bars in which the lower end of the auxiliary seat-supporting standard is guided, illustrating the construction of the same.

A represents any ordinary vehicle-seat, to the underneath side of which is secured the board or plate B, carrying the forward bracket or cross-bar C and the rearward cross-bar D, connected by guide-bars E, sliding in which is the bolt F of the standard G, supporting the auxiliary seat H.

The seat H has depending therefrom and secured in any desirable manner the lug or lugs I, hinged to the upper extremity $G'$ of the standard G at the point $g$, and when in its operative position the seat is retained from turning on its pivot either backward or forward by means of the spring bar or rod K, secured thereto in any desirable manner, and preferably passing through a slot $g^2$ in the supporting-standard G. The spring-bar K prevents the forward tipping of the seat by bearing with its lower edge against the lower face $g^3$ of the slot $g^2$, and prevents the rearward tipping of the seat by means of a lug $k$, secured to said bar K and bearing in any desirable manner upon the side of the supporting-standard.

When it is desired to replace the seat H from its operative position, the handle $K'$, suitably secured to the spring-rod K, is engaged and forced to the position illustrated by dotted lines in Fig. 4, disengaging the lug or notch $k$ from its abutment on the supporting-standard G, when the seat may be readily turned over, the bar K being allowed to swing upward as the slot $g$ is opened at its upper extremity.

The bolt or lugs F, secured to the supporting-standard G, may be attached thereto in any desirable manner, and are guided in slots or ways $e$, provided in the guide-bars E, the forward end of which slot is preferably above the cross bracket or bar C, and is provided with the drop slot or extension $e'$, as shown in Figs. 1 and 5.

When the seat is withdrawn from its concealed position, (shown by dotted lines in Fig. 1,) the bolt or lugs F, secured thereto, ride in the slots e, and when the forward extremity of said slot is reached the standard is swung up on said bolt as a pivot, and is then forced downward, with its bolt or lugs F riding downwardly in the slot e', and forcing the open slot L, provided in the lower extremity of said standard G, to register with or cap over the cross-bar C, preventing the rearward or forward movement of the bar G by means of the lugs or sides l of the slot L.

When, after the seat H has been swung over from its operative position by means of the disengagement of the bar K, as previously described, and it is desired to return the seat to its concealed position, the standard G is elevated sufficiently to allow the lugs l l to disengage from the cross-bar C, whereupon the supporting-standard G is rocked on the bolt F.

All the parts of my auxiliary seat are simple in construction, easily manufactured from either cast or sheet metal, while some of the parts—as, for instance, the guideways—may be easily made of wood, thus producing at a slight expenditure additional seat-room, which is normally concealed beneath the ordinary seat, and, when desired, especially when three are to ride upon an ordinary seat, the same may be readily withdrawn, affording an efficient and desirable seat, which, when not needed, can be readily replaced, as previously described.

In the drawings I have illustrated my auxiliary seat H and its guideways e as attached to a plate B, which may be readily secured to any ordinary seat by means of screws or bolts without any previous fitting of the parts; but it will be understood that in the manufacture of vehicles it will often be desirable to attach the guide-bars E and cross-bars C and D directly to the seat itself without the interposition of any board or plate B.

The operation of my invention will be readily perceived from the foregoing, and it will be understood that without departing from the spirit of my invention considerable change may be made in the detail construction and arrangement of the parts—as, for example, the manner in which the seat H is prevented from rotating on its pivot when in its operative position, and the means for preventing rearward or forward tipping of the supporting-standard G.

Having thus fully described my invention, what I claim as new, and desire to secure by Letters Patent, is—

1. The combination, with the ordinary seat of a vehicle, of an extension-seat hinged to a swinging supporting-standard and adapted to fold under the ordinary seat and be withdrawn therefrom to operative position, substantially as specified.

2. The combination, with the ordinary seat of a vehicle, of a guideway beneath the ordinary seat, an auxiliary seat, and a supporting-standard for said seat hinged to the guideway, substantially as and for the purpose specified.

3. The combination, with the ordinary seat of a vehicle, of a hinged auxiliary seat adapted to fold over and a supporting-standard for the auxiliary seat, said standard hinged at its lower extremity and adapted to fold under the ordinary seat and be withdrawn therefrom to operative position, substantially as specified.

4. The combination, with the ordinary seat of a vehicle, of a supporting-standard, an auxiliary seat hinged thereto, and a swinging bar K, secured to the seat and automatically abutting against shoulders on said supporting-standard, retaining the seat in operative position, said bar being adapted to be disengaged from abutment with the standard when the seat is folded, substantially as and for the purpose set forth.

5. The seat H, a guideway e, and the supporting-standard G for the seat H, said standard hinged to the guideway and held from movement when in operative position, substantially as and for the purpose set forth.

6. The combination, with the ordinary seat of a vehicle, of an auxiliary seat, a guideway beneath the ordinary seat, and a swinging supporting-standard for the auxiliary seat, provided with a pivotal pin or stud for engaging the said guideway and guiding the swinging support, substantially as and for the purpose specified.

7. The combination, with the ordinary seat of a vehicle, of an auxiliary seat, guideways beneath the ordinary seat, and a supporting-standard interposed between the guideways, and having a pin F riding in said guideways for guiding the supporting-standard and hinging the same thereto, substantially as and for the purpose specified.

8. The combination, with the ordinary seat of a vehicle and a guideway beneath said seat, of an auxiliary seat, a supporting-standard for said seat, a pin or stud for pivoting said supporting-standard to the guideway and guiding the same beneath the ordinary seat, and means, substantially as described, for retaining the pivoted supporting-standard in its upright position when withdrawn from the ordinary seat, substantially as and for the purpose specified.

9. The combination, with the bar or support C, of an auxiliary seat H and a rocking standard G, having an open slot L, adapted to register with the bar C when the seat is in operative position, substantially as and for the purpose described.

10. The combination, with the ordinary seat of a vehicle, of an extension-seat and a swinging standard G, having a lug or pin F secured thereto and guided in a way beneath the ordinary seat, substantially as described.

11. The combination, with the ordinary seat of a vehicle, of the parallel guideways e, the standard G, the pins or lugs F, projecting from said standard and guided in said ways, and an extension-seat hinged to said standard G, substantially as and for the purpose set forth.

12. The combination, with the ordinary seat of a vehicle, guideways $e$, having the extension $e'$, and a bar or support C, of the auxiliary seat H and the standard G, guided in the ways E and $e$, said standard being engaged with the bar C when guided to the extension $e'$, substantially as and for the purpose set forth.

In testimony whereof I have hereunto signed my name, in the presence of two attesting witnesses, at Syracuse, in the county of Onondaga, in the State of New York, this 1st day of December, 1888.

FREDERICK C. STRAUB.

Witnesses:
 A. E. PARSONS,
 CLARK H. NORTON.